US009760383B2

(12) United States Patent
DiVincent et al.

(10) Patent No.: US 9,760,383 B2
(45) Date of Patent: Sep. 12, 2017

(54) DEVICE CONFIGURATION WITH MULTIPLE PROFILES FOR A SINGLE USER USING REMOTE USER BIOMETRICS

(71) Applicant: Apple Inc., Cupertino, CA (US)

(72) Inventors: Michael DiVincent, Cupertino, CA (US); Nicole J. Hollopeter, Cupertino, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 14/161,976

(22) Filed: Jan. 23, 2014

(65) Prior Publication Data

US 2015/0205622 A1    Jul. 23, 2015

(51) Int. Cl.
*G06F 9/445* (2006.01)
*G06F 21/32* (2013.01)

(52) U.S. Cl.
CPC ............ *G06F 9/4451* (2013.01); *G06F 21/32* (2013.01)

(58) Field of Classification Search
CPC ............................... G06F 21/32; G06F 9/4451
See application file for complete search history.

(56) References Cited

U.S. PATENT DOCUMENTS

| 6,028,950 | A  | 2/2000  | Merjanian    |
|-----------|----|---------|--------------|
| 7,564,369 | B1 | 7/2009  | Adams et al. |
| 7,925,887 | B2 | 4/2011  | Burton       |
| 8,055,001 | B2 | 11/2011 | Boguslavskij |
| 8,192,280 | B2 | 6/2012  | Muth         |
| 8,279,049 | B2 | 10/2012 | Maier        |
| 8,299,889 | B2 | 10/2012 | Kumar et al. |

(Continued)

FOREIGN PATENT DOCUMENTS

| CN | 1293787 | 5/2001 |
| CN | 1526251 | 9/2004 |

(Continued)

OTHER PUBLICATIONS

Uchida, "Fingerprint-based user-friendly interface and pocket-PID for mobile authentication," Proceedings of the 15th International Conference on Pattern Recognition, 2000, vol. 4, pp. 205-209; Digital Object Identifier: 10.1109/ICPR.2000.902896.

(Continued)

*Primary Examiner* — Thomas Lee
*Assistant Examiner* — Chad Erdman
(74) *Attorney, Agent, or Firm* — Brownstein Hyatt Farber Schreck, LLP

(57) ABSTRACT

An electronic device receives data associated with at least one biometric detected by a sensor of a remote control device that is operable to transmit one or more instructions to the electronic device. A profile for a user associated with the data is determined out of a number of profiles for the user based on the data. The electronic device is then be configured in one or more ways according to the determined user profile. A user may have any number of different profiles for the electronic device, each associated with a different biometric or combination of biometrics. In this way, a user may easily access different experiences with the same device that may each be fully personalized in a different way and/or for a particular purpose.

20 Claims, 4 Drawing Sheets

(56) References Cited

U.S. PATENT DOCUMENTS

| | | |
|---|---|---|
| 8,381,239 B2 * | 2/2013 | Burton .............. H04N 21/44218 340/4.11 |
| 8,421,931 B2 | 4/2013 | Park et al. |
| 8,464,289 B2 | 6/2013 | Pan |
| 8,553,947 B2 | 10/2013 | Benini |
| 8,648,692 B2 | 2/2014 | Himmelstein |
| 8,656,486 B2 | 2/2014 | Hicks et al. |
| 8,782,703 B2 | 7/2014 | Beadle et al. |
| 9,160,743 B2 | 10/2015 | Anantharaman |
| 9,319,726 B2 | 4/2016 | Beadle et al. |
| 2003/0028872 A1 | 2/2003 | Milovanovic et al. |
| 2003/0172283 A1 | 9/2003 | O'Hara |
| 2004/0179692 A1 | 9/2004 | Cheng |
| 2006/0107281 A1 * | 5/2006 | Dunton .............. G07C 9/00158 725/11 |
| 2006/0271791 A1 | 11/2006 | Novack |
| 2006/0293892 A1 | 12/2006 | Pathuel |
| 2007/0113165 A1 | 5/2007 | Hsieh et al. |
| 2007/0299670 A1 | 12/2007 | Chang |
| 2008/0026725 A1 | 1/2008 | Cha |
| 2008/0278635 A1 | 11/2008 | Hardacker et al. |
| 2009/0058595 A1 | 3/2009 | Mainguet et al. |
| 2009/0138907 A1 | 5/2009 | Wiser et al. |
| 2009/0146779 A1 * | 6/2009 | Kumar .............. G06K 9/00885 340/5.31 |
| 2009/0169070 A1 | 7/2009 | Fadell |
| 2009/0251619 A1 | 10/2009 | Seidel et al. |
| 2010/0052853 A1 | 3/2010 | Hilton |
| 2010/0138914 A1 * | 6/2010 | Davis .................. G06F 21/32 726/19 |
| 2010/0146278 A1 | 6/2010 | Maier |
| 2010/0157168 A1 | 6/2010 | Dunton et al. |
| 2010/0171634 A1 | 7/2010 | Liang |
| 2011/0121943 A1 | 5/2011 | Morovitz et al. |
| 2011/0221568 A1 * | 9/2011 | Giobbi .................. G06F 19/322 340/5.82 |
| 2011/0221622 A1 | 9/2011 | West et al. |
| 2012/0074217 A1 * | 3/2012 | Block .................. G06Q 20/327 235/379 |
| 2012/0135684 A1 | 5/2012 | Shrum et al. |
| 2012/0167123 A1 | 6/2012 | Gavita |
| 2012/0204201 A1 | 8/2012 | Cassidy et al. |
| 2012/0206236 A1 | 8/2012 | King |
| 2012/0314140 A1 | 12/2012 | Wiser et al. |
| 2013/0067545 A1 * | 3/2013 | Hanes .................. H04L 9/3231 726/6 |
| 2013/0133022 A1 | 5/2013 | Bi et al. |
| 2014/0122645 A1 * | 5/2014 | Brown .................. H04L 67/30 709/217 |
| 2015/0046990 A1 * | 2/2015 | Oberheide .............. G06F 21/32 726/6 |
| 2015/0150103 A1 | 5/2015 | Marais et al. |
| 2015/0205623 A1 | 7/2015 | DiVincent et al. |
| 2015/0206366 A1 | 7/2015 | DiVincent et al. |

FOREIGN PATENT DOCUMENTS

| | | |
|---|---|---|
| CN | 2932523 | 8/2007 |
| CN | 101040358 | 9/2007 |
| CN | 101261504 | 9/2008 |
| CN | 101783063 | 7/2010 |
| CN | 201965635 | 9/2011 |
| CN | 102609186 | 7/2012 |
| CN | 102750434 | 10/2012 |
| CN | 102930195 | 2/2013 |
| CN | 102986201 | 3/2013 |
| CN | 204833267 | 12/2015 |
| DE | 10117765 | 10/2002 |
| EP | 1173838 | 1/2002 |
| EP | 2429183 | 3/2012 |
| GB | 2388941 | 11/2003 |
| JP | 2000244830 | 9/2000 |
| JP | 2001045580 | 2/2001 |
| JP | 2006270845 | 5/2006 |
| JP | 2010087596 | 4/2010 |
| KR | 20100125484 | 1/2010 |
| WO | WO 99/54841 | 10/1999 |
| WO | WO 01/91057 | 11/2001 |
| WO | WO 03/050770 | 6/2003 |
| WO | WO 03/053060 | 6/2003 |
| WO | WO 2004/055717 | 7/2004 |
| WO | WO 2006/043324 | 5/2006 |

OTHER PUBLICATIONS

U.S. Appl. No. 14/162,030, filed Jan. 23, 2014, DiVincent, et al.
U.S. Appl. No. 14/161,996, filed Jan. 23, 2014, DiVincent, et al.

* cited by examiner

DEVICE CONFIGURATION WITH MULTIPLE PROFILES FOR A SINGLE USER USING REMOTE USER BIOMETRICS

TECHNICAL FIELD

This disclosure relates generally to electronic device configuration, and more specifically to configuring electronic devices multiple ways for a single user based on remotely received user biometrics.

BACKGROUND

Many electronic devices (such as computing devices, smart phones, set top boxes, and so on) may be configurable to provide a personalized experiences for users. Such personalized experiences may include configuring a variety of different aspects of a user's experience with an electronic device.

Many electronic devices are only able to provide a single personalized experience for any user. In such cases, the electronic device may be configured to alter one or more aspects of a user's experience with the device, but such alteration will alter any experience the user (or any user) has when utilizing the device.

Some electronic devices are capable of providing different experiences for a user via one or more different user accounts. In such cases a user may be required to set up multiple profiles for themselves and provide a log in and/or password in order to enter the particular desired account and access the specific personalized experience. Such may be annoying and/or burdensome to users and such annoyance or burden may be magnified when a user is attempting to utilize the electronic device via one or more remote control devices.

SUMMARY

The present disclosure discloses systems and methods for configuring electronic devices multiple ways for a single user based on remotely received user biometrics. An electronic device may receive data associated with at least one biometric detected by a sensor of a remote control device that is operable to transmit one or more instructions to the electronic device. A profile for a user associated with the data may be determined out of a number of profiles for the user based on the data. The electronic device may then be configured in one or more ways according to the determined user profile. A user may have any number of different profiles for the electronic device, each associated with a different biometric or combination of biometrics. In this way, a user may easily access different experiences with the same device that may each be fully personalized in a different way and/or for a particular purpose.

In some implementations, the biometric may include one or more fingerprints. As such, the user may have different profiles associated with different fingerprints and/or different combinations of fingerprints. However, in other implementations the biometric may include one or more of a variety of different biometrics including, but not limited to, retinal or facial images, palm prints, toe prints, hand prints, voice samples, gesture patterns, and/or any other kind of biometric detectable by one or more sensors of the remote control device. In such implementations, the user may have different profiles associated with different retina scans, different palm prints, different toe prints, different gesture patterns, and/or different combinations of such, and/or different combinations of different biometrics.

In various implementations, the remote control device may transmit the biometric to the electronic device, a hash value derived from the biometric, a profile identifier associated with the biometric, and/or other data derived from and/or otherwise associated with the biometric. In one or more implementations, the remote control device may interact with one or more other electronic devices as part of transmitting such data.

Personalization of experiences through such configuration of the electronic device may include, but is not limited to, providing access and/or not providing access to one or more files or applications, altering the presentation of one or more user interfaces, enabling and/or disabling one or more software and/or hardware components, altering the way that one or more user interfaces may be interacted with, modifying presentation settings altering the functionality of one or more software and/or hardware components, organizing storage of one or more files and/or applications, configuring user authentication for one or more content delivery and/or other services, and/or any other aspect of a user's experience with the electronic device.

In some cases, the electronic device may remain configured according to the determined user profile until the occurrence of one or more reconfiguration events. Such reconfiguration events may include receipt of an indication to reconfigure, expiration of a timer, receipt of data associated with at least one different biometric, and/or any other such event that indicates that reconfiguration is to be performed. In such cases, the electronic device may be reconfigured according to one or more other determined user profiles, generic profiles, default profiles, and so on.

In various cases, the configuration of the electronic device may be partial instead of total. For example, the electronic device may be configured for a user's personal profile such that access to a work file has not been enabled. A biometric associated with the user's work may be remotely received and, in response, the electronic device may be configured to enable access to the work file based on the work profile associated biometric without reconfiguring any other aspect of the electronic device currently configured for the user's personal profile.

In some implementations, a system for configuring electronic devices multiple ways for a single user based on remotely received user biometrics may include: at least one remote control device that includes at least one sensor that detects at least one biometric and at least one electronic device that is configured to receive at least one instruction from the at least one remote control device wherein the at least one electronic device receives data associated with the at least one biometric, determines which profile of a user is associated with the data out of a plurality of profiles for the user, and configures the at least one electronic device according to the profile.

In one or more implementations, a method for configuring electronic devices based on remotely received user biometrics may include: receiving, utilizing at least one electronic device, data associated with at least one biometric detected by at least one sensor of at least one remote control device that is configured to transmit at least one instruction to the at least one electronic device; determining, utilizing the at least one electronic device, which profile of a user is associated with the data out of a plurality of profiles for the user; and configuring the at least one electronic device according to the determined profile.

In various implementations, an electronic device may include: at least one communication component that is configured to receive at least one instruction from at least one remote control device and at least one processing unit that: receives data associated with at least one biometric detected by at least one sensor of the at least one remote control device; determines which profile of a user is associated with the data out of a plurality of profiles for the user; and configures the electronic device according to the profile.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
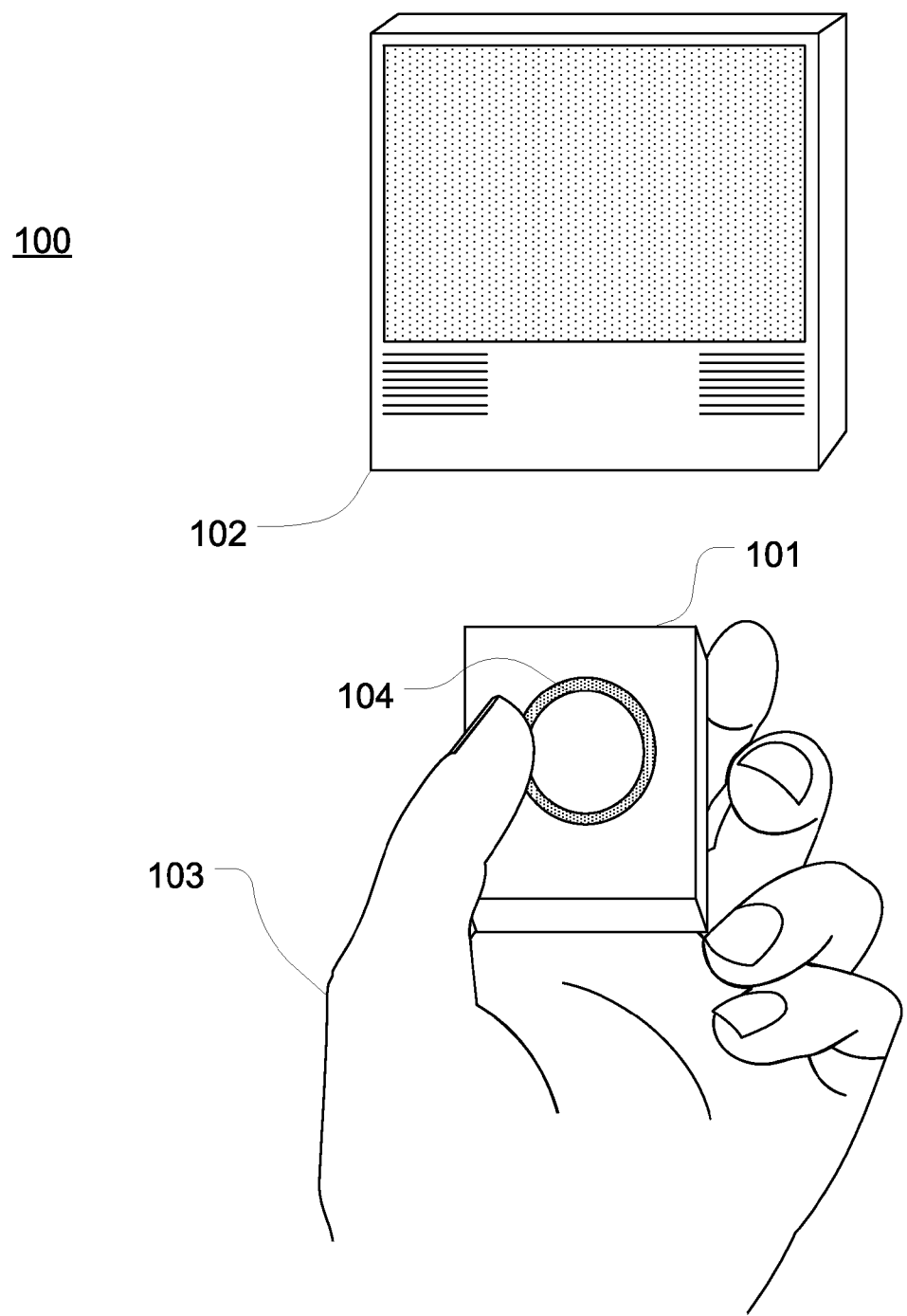
FIG. 1 is an isometric view of a system for configuring electronic devices multiple ways for a single user based on remotely received user biometrics.

The description that follows includes sample systems, methods, and computer program products that embody various elements of the present disclosure. However, it should be understood that the described disclosure may be practiced in a variety of forms in addition to those described herein.

The present disclosure discloses systems and methods for configuring electronic devices multiple ways for a single user based on remotely received user biometrics. An electronic device may receive data associated with at least one biometric detected by a sensor of a remote control device. A profile for a user associated with the data may be determined out of a number of profiles for the user based on the data. The electronic device may then be configured in one or more ways according to the determined user profile.

A user may have any number of different profiles for the electronic device, each associated with a different biometric or combination of biometrics. In this way, a user may easily access different experiences with the same device that may each be fully personalized in a different way and/or for a particular purpose. In some cases, the user may be able to maintain as many different profiles as the user is able to provide different biometrics and/or combinations of biometrics.

In some implementations, the biometric may include one or more fingerprints detected by one or more touch sensors of the remote control device and/or other sensors capable of detecting one or more fingerprints. As such, the user may have different profiles associated with different fingerprints and/or different combinations of fingerprints.

However, in other implementations the biometric may include one or more of a variety of different biometrics including, but not limited to, retinal or facial images, palm prints, toe prints, hand prints, voice samples, gesture patterns, and/or any other kind of biometric detectable by one or more sensors of the remote control device. In such implementations, the user may have different profiles associated with different retina scans, different palm prints, different toe prints, different gesture patterns, and/or different combinations of such, and/or different combinations of different biometrics.

Personalization of experiences through such configuration of the electronic device may include, but is not limited to, providing access (and/or not providing access) to one or more files or applications, altering the presentation of one or more user interfaces, enabling and/or disabling one or more software and/or hardware components, altering the way that one or more user interfaces may be interacted with, modifying presentation settings (such as volume, brightness, contrast, and so on), altering the functionality of one or more software and/or hardware components, organizing storage of one or more files and/or applications, configuring user authentication for one or more content delivery and/or other services, and/or any other aspect of a user's experience with the electronic device.

In some cases, the electronic device may remain configured according to the determined user profile until the occurrence of one or more reconfiguration events. Such reconfiguration events may include receipt of an indication to reconfigure (such as a user log out), expiration of a timer, receipt of data associated with at least one different biometric, and/or any other such event that indicates that reconfiguration is to be performed. In such cases, the electronic device may be reconfigured according to one or more other determined user profiles, generic profiles, default profiles, and so on.

In various implementations, the remote control device may transmit the biometric to the electronic device, a hash value derived from the biometric, a profile identifier associated with the biometric, and/or other data derived from and/or otherwise associated with the biometric. In one or more implementations, the remote control device may interact with one or more other electronic devices (such as one or more computing devices configured in a cloud computing configuration via one or more communication networks) as part of transmitting such data.

In one or more implementations, the electronic device may interact with one or more other electronic devices (such as one or more computing devices configured in a cloud computing configuration via one or more communication networks) as part of determining the particular profile of the user based on the received data associated with the biometric. Such interaction may include, but is not limited to, transmitting the biometric and/or a hash value derived from the biometric and obtaining data regarding the particular profile (such as a profile identifier) and/or the profile, transmitting an identifier derived from and/or included in the data and receiving data regarding the particular profile, and/or other such interaction.

In various cases, the configuration of the electronic device may be partial instead of total. For example, the electronic device may be configured for a user's personal profile such that access to a work file has not been enabled. A biometric associated with the user's work may be remotely received and, in response, the electronic device may be configured to enable access to the work file based on the work profile associated biometric without reconfiguring any other aspect of the electronic device currently configured for the user's personal profile.

In this way, as more fully elaborated below and in the accompanying illustrations, an electronic device may provide a number of different personalized experiences for a user and/or different users without burden and/or annoyance.

FIG. 1 is an isometric view of a system 100 for electronic device configuration using remotely received user biometrics. The system 100 includes an electronic device 102 and a remote control device 101. The remote control device may be operable to transmit one or more instructions to the electronic device.

Though the electronic device 102 is illustrated as a television and the remote control device 101 is illustrated as a dedicated remote control with a single control element (e.g., the sensor 104), it is understood that this is an example. In various implementations the electronic device may be any electronic device that is capable of receiving instructions from the remote control device and the remote control device may include any electronic device that is capable of transmitting instructions to the electronic device. Such electronic devices (and/or remote controls, in some embodiments) may include one or more televisions, set top boxes, media centers, desktop computing devices, media controllers, media players, laptop computing devices, wearable devices, tablet computing devices, mobile computing devices, cellular telephones, smart phones, wearable devices, kitchen appliances, automobiles, voice over internet protocol telephones, displays, microphones, speakers, video game console, HVAC (heating, ventilation, and/or air conditioning) systems, lighting systems, and/or any other electronic device(s).

The remote control device 101 may include at least one sensor 104 that detects at least one biometric from at least one user 103. As illustrated, the sensor may be a touch sensor (such as a capacitive sensor, an ultrasonic sensor, and/or other touch sensor) that is operable to detect at least one fingerprint. However, it is understood that this is an example. In various implementations, the sensor may be any kind of sensor (such as one or more cameras, inertial sensors, photoplethysmographic sensors, and so on) that is operable to detect at least one biometric of the user. Such biometrics may include, but are not limited to, retinal or facial images, palm prints, toe prints, hand prints, voice samples, gesture patterns, and/or any other kind of biometric detectable by the sensor.

The remote control device 101 may transmit data regarding the biometric to the electronic device 102. The transmitted data may include the biometric, a hash value derived from the biometric (which may uniquely identify the biometric), a profile identifier associated with the biometric, and/or other data derived from and/or otherwise associated with the biometric. In one or more implementations, the remote control device may interact with one or more other electronic devices (such as one or more computing devices configured in a cloud computing configuration via one or more communication networks) (see additional electronic device(s) 208 in FIG. 2) as part of transmitting such data.

The electronic device 102 may receive data associated with the biometric. A profile for a user 103 associated with the data may be determined out of a number of possible profiles for that user (and/or profiles for various other users). The electronic device then configure itself in one or more ways according to the determined user profile.

By configuring itself according to the determined user profile, the electronic device 102 may personalize an experience the user 103 will have when interacting with the electronic device under that profile. Such personalization may include, but is not limited to, providing access (and/or not providing access) to one or more files or applications via the electronic device, altering the presentation of one or more user interfaces provided by the electronic device, enabling and/or disabling one or more software and/or hardware components of the electronic device, altering the way that one or more user interfaces of the electronic device may be interacted with, modifying presentation settings (such as volume, brightness, contrast, and so on) of the electronic device, altering the functionality of one or more software and/or hardware components of the electronic device, organizing storage of one or more files and/or applications stored by the electronic device, one or more favorites, one or more date book entries, one or more contacts, one or more emails or email databases, configuring user authentication for one or more content delivery and/or other services, and/or any other aspect of the user's experience with the electronic device.

By way of a first example, a user 103 may utilize the electronic device 102 for both home and work purposes and may have a separate profile set up for each. Each profile may have a respective set of files and applications loaded on the electronic device. Further, each profile may have configured a respective user interface configuration (such as a volume level, a screen layout, a background picture, a screen saver, screen saver and/or energy saver settings, a desktop configuration, a file folder organization structure, a brightness and/or contrast level, browser favorites, navigation cursor speed, and/or any other such user interface configuration settings) for the electronic device. When the user provides a first biometric (such as the fingerprint of the user's left index finger) to the remote control device 101 via the sensor 104, the electronic device may configure itself to provide his set of files and applications and to provide one or more user interfaces according to his work profile. By way of contrast, when the user provides a second biometric (such as the fingerprint of the user's left thumb) to the remote control device via the sensor, the electronic device may configure itself to provide her set of files and applications and to provide one or more user interfaces according to his home profile.

By way of a second example, a user 103 may have separate profiles configured on the electronic device 102 for private and family use. The user may allow the user's children to utilize the electronic device when configured according the family use profile, which may block adult programming. The user may not allow the user's children to utilize the electronic device when configured according to the private profile, which may allow access to adult programming. In some cases, the user may provide a first biometric (such as the user's right pointer finger) to configure the electronic device according to the family profile and a second biometric (such as each of the fingerprints from each of the fingers on the user's left hand in sequence from pinkie to thumb) to configure the electronic device according to the private profile. Alternatively, in some cases configuration of the electronic device according to the family profile may not require the user to provide a biometric but configuring the electronic device according to the private profile may still require the user to provide a biometric.

By way of a third example, the electronic device 102 may be a media center control device that is configured to control the connections and configurations of multiple media center elements (such as one or more televisions, lighting systems, video cassette recorders, digital video disk players, sound systems, digital media players, and so on). The user 103 may have the electronic device to configure a first set of media center elements in a first way as a normal television watching profile (such as the lighting system set to a "daylight"

lighting level, the television configured to display programming from a set top box, and sound system configured to a non-surround sound setting) and a second set of media center elements in a second way as a movie watching profile (such as the lighting system set to a "dim" lighting level, the television configured to display programming from a digital video disc player, and sound system configured to a surround sound setting). As such, the user may provide the fingerprint from the user's left thumb to configure the electronic device according to the normal television watching profile and the user's right thumb to configure the electronic device according to the movie watching profile.

By way of a fourth example, the electronic device 102 may suggest content (such as one or more movies, songs, music videos, games, product advertisements, television shows, and so on) during usage. Such suggestions may be based on other content that has been accessed, searched, and so on during usage. In this example, such suggestions may be based on content that has been accessed, searched, and so on during usage while configured according to the current profile. Content that has been accessed, searched, and so on during usage while configured according to another profile may not be utilized when determining content to suggest.

For instance, a user 103 may provide a first biometric utilizing the remote control device 101 and utilize the electronic device 102 configured according to a first profile to access content at a first time. The user may then provide a second biometric utilizing the remote control device and utilize the electronic device configured according to a second profile to access content at a second time. Then, the user may again provide the first biometric utilizing the remote control device and utilize the electronic device configured according to the first profile to access content at a third time. During usage at the third time, the electronic device may determine to suggest content. In suggesting such content, the electronic device may determine content to suggest based on the content accessed at the first time and the third time, but not the second time. In this way, the suggested content is selected for the user based on the choices associated with the first profile, not the second profile, even though both the electronic device was utilized under both profiles. Thus, the user may be able to use different profiles for different purposes (such as an "action" profile when the user is in the mood for action programming and a "romantic comedy" profile when the user is in the mood for romantic comedy programming) and have content suggestions appropriate for each.

By way of a fifth example, a user 103 may operate a number of different businesses, such as ten, and utilize the electronic device 102 for each. In order to keep files, programs, emails, and other such configurations separate for each of the businesses, the user may configure a separate profile for each business. The user may also associate each of the separate profiles with a separate biometric, such as each of the separate business profiles with the fingerprint of one of the user's ten fingers. In order to configure the electronic device for a particular business profile, the user may provide the fingerprint of the respective finger.

By way of a sixth example, the user 103 may utilize the electronic device 102 with one or more content delivery and/or other services with which the user has an account. Such an account may be an application service account, a video or music download account, a video or music on demand account, and/or any other such content delivery or other service. Further, such a content delivery and/or other service may be configured to require user authentication such as a password, the biometric, and/or other such authentication mechanism. The user may want to make sure that the user does not purchase content inadvertently. As such, the user may configure a normal use profile which is configured such that the user must still log into the content delivery and/or other service and a purchase profile which is configured such that the user is automatically logged into the content delivery and/or other service.

In such a case, when the user 103 provides a biometric for the purchase profile (such as fingerprints from the user's left hand in any order), the electronic device 102 may confirm (such as by providing the biometric, providing evidence that the correct biometric has been provided, providing a password or other authentication information associated with the biometric or user, and so on) that the user has been authenticated by providing the biometric in order to automatically authenticate the user for the content delivery and/or other service account. As such, when the user utilizes the content delivery and/or other service via the electronic device 102 configured according to the purchase profile, the content delivery and/or other service may treat the user as already authenticated. However, when the user utilizes the content delivery and/or other service via the electronic device configured according to the normal use profile, the electronic device may not have automatically authenticated the user and the user may be prompted for login information.

By way of a seventh example, a television may be shipped with a remote control device and configured with a default profile for a generic user (one not associated with a biometric and/or one defined to be utilized when a provided biometric is not recognized). When the purchaser of the television ("Fred") provides a particular biometric to the remote, the television may not recognize data received associated with Fred's particular biometric because the television has not yet been configured to recognize data associated with any biometrics. As such, the television may poll devices on a local network and/or other local communication medium for any devices that recognize the data associated with the particular biometric. Another device (such as Fred's smart phone) which does so recognize the data associated with the particular biometric may respond with information that the other device has associated with the data. The television may then configure itself based on the received information.

In some cases of the above example, the information may include the profile and/or other configuration details. However, in other cases, not all of the configuration details known to the other device may be applicable to the television. In such a case, the other device may only transmit and/or the television may only configure itself according to the configuration details applicable to the television. For instance, configuration details stored by the smart phone that are applicable to the television may only include Fred's name. As such, the television may configure itself to present a prompt reading: "Hello, Fred. Shall we set me up for you?"

In various cases, the other device may require confirmation before responding to the information request from the television regarding the data associated with the biometric. For example, Fred's smart phone may receive such a request and require Fred to provide the particular biometric before the smart phone provides the information to the television.

By way of an eighth example, the user 103 may utilize the electronic device 102 in a number of modes. In one such mode, the user may utilize the electronic device to play video games. In another such mode, the user may utilize the electronic device to operate productivity software such as word processors or spreadsheet programs. The user may desire to have various user interface devices (such as one or more keyboards, joysticks, mice, and so on) configured differently for video game mode than for productivity mode. For example, in video game mode only certain keys may have assigned game functions and the user may configure the keyboard to ignore any input from other keys whereas in productivity mode the entire keyboard may be active. The user may then associate each mode with a respective biometric. As such, when the user provides a first biometric (such as a retina scan of the user's left eye), the keyboard may be restricted for video game mode. By way of contrast, when the user provides a second biometric (such as a fingerprint of the user's right pinkie finger), the keyboard may be fully enabled for productivity mode.

By way of a ninth example, the user 103 may wish to keep certain files stored on the electronic device 102 secret. If the user will be operating the electronic device around others, the user may set up a "public" profile, which does not have access to the certain files, for the user to use when others are around. The user may then also set up a "secret" profile that has access to the certain files for the user to use when others are not around. As the user utilizes the electronic device when others are around, the others may not suspect that the certain files exist. The user may associate each profile with different biometrics such that when a first biometric is provided (such as the fingerprint of the user's left pointer finger) the electronic device is configured according to the public profile whereas when the second biometric is provided (such as each of the user's fingerprints in alternating order from left pinkie to right pinkie) the electronic device is configured according to the private profile.

Additionally, though the above discussion describes the various biometrics as those of the user, it is understood that these are examples. Other implementations are possible without departing from the scope of the present disclosure. For instance, in the ninth example above, the user may utilize a combination of the user's biometrics and biometrics of one or more others for the second biometric in order to keep the certain files even more secret. In some cases, the second biometric may be the user's fingerprints in alternating order from left pinkie to right pinkie followed by the front left paw of the user's cat. As others may not even suspect that the user may be using the user's cat as part of a biometric sequence, it is even less likely that others could find a way to access and/or learn the existence of the certain files.

By way of a tenth example, the user 103 may occasionally use the electronic device 102 to evaluate files which the user believes may contain malware, viruses, and/or other suspicious content. To avoid potential consequences from evaluating such files, the user may configure the electronic device with an "ordinary operation" mode associated with a first biometric and a "safe" mode associated with a second biometric. The safe mode may be similar to the ordinary operation mode except that access to files other than the suspicious files may not be permitted and network communications components of the electronic device may be disabled. Thus, when the user provides the first biometric, the user may utilize the electronic device as normal. However, when the user provides the second biometric, the user may be able to evaluate the suspicious files without fear of contaminating the user's normal files and/or potentially infecting other devices via the network communications components.

By way of an eleventh example, the user 103 may share the electronic device 102 with another user. Content stored by the electronic device may be shared by the two users. As such, deleting and/or otherwise modifying the shared content may affect both users. In such a case, the user may have a separate profile associated with a biometric of just the user (such as the user's right thumbprint) and a combined profile associated with a combination of the biometric of the user followed by a biometric of the other user (such as the fingerprint of the other user's left pinkie). When the user provides the user's biometric, the electronic device may enable the user to view content. However, when the user provides the user's biometric and then the other user provides the other user's biometric, the electronic device may configure itself according to the combined profile and allow the content to be deleted and/or otherwise modified.

Figure 2:
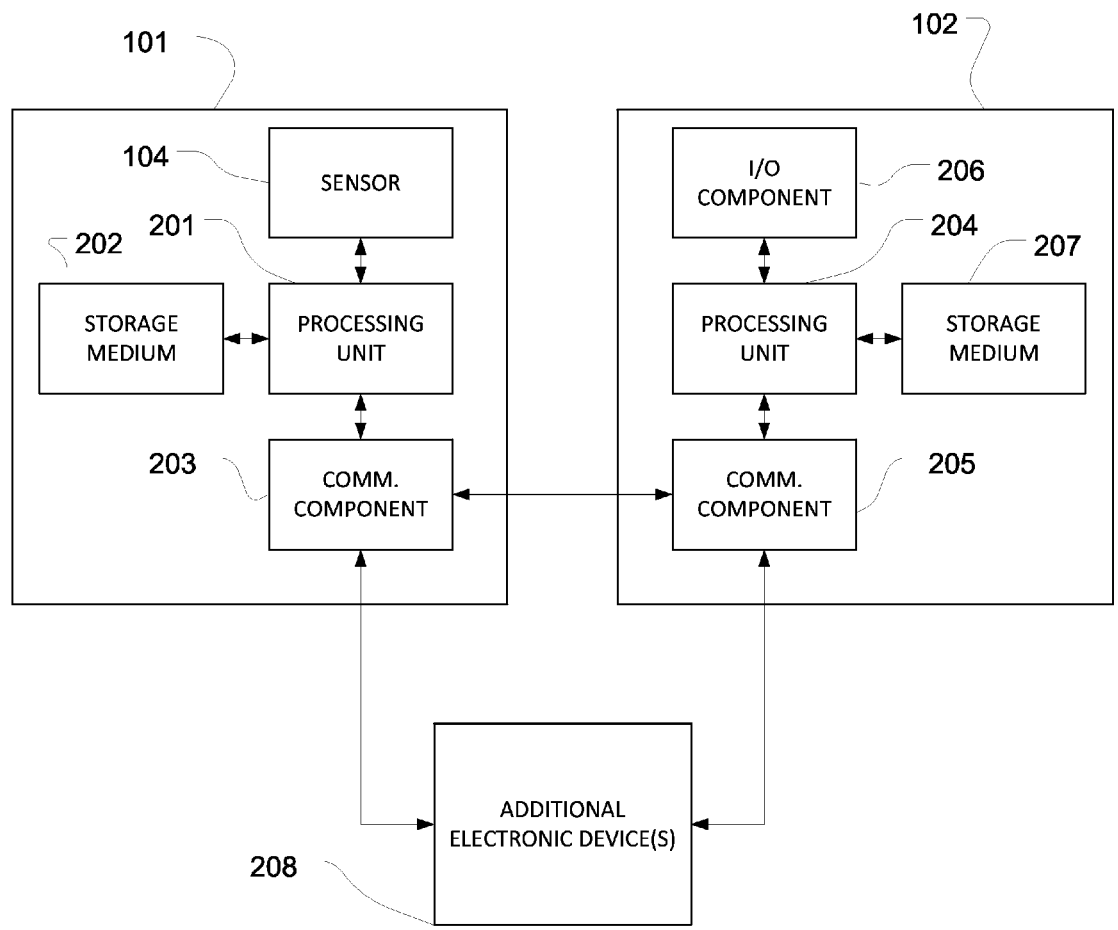
FIG. 2 is a block diagram illustrating the functional relationships of components of the system of FIG. 1.

In one or more implementations, the electronic device 102 may interact with one or more other electronic devices (such as one or more computing devices configured in a cloud computing configuration via one or more communication networks) (see additional electronic device(s) 208 in FIG. 2) as part of determining the profile based on the received data associated with the biometric. Such interaction may include, but is not limited to, transmitting the biometric and/or a hash value derived from the biometric and obtaining data regarding the profile (such as an identifier) and/or the profile, transmitting an identifier derived from and/or included in the data and receiving data regarding the profile, and/or other such interaction.

In some cases, the electronic device 102 may remain configured according to the determined profile until the occurrence of one or more reconfiguration events. Such reconfiguration events may include receipt of an indication to reconfigure (such as a log out), expiration of a timer, receipt of data associated with at least one different biometric, and/or any other such event that indicates that reconfiguration is to be performed. In such cases, the electronic device may be reconfigured according to one or more other determined profiles for the user and/or one or more other users, generic profiles, default profiles, and so on.

For example, a user 103 may configure a television with a personal profile associated with a biometric to enable the user to access any program and a generic profile that does not require a biometric that blocks adult programming. When the user provides the biometric, the television may configure itself for the user's personal profile. However, after a certain period of inactivity (such as one hour), the television may reconfigure itself according to the generic profile. In this way, a user may watch whatever content the user wishes and not have to worry about having to remember to reconfigure after use in order to prevent her children or others from accessing adult programming.

By way of another example, a user may configure the electronic device 102 to provide a personalized environment when the user provides a first biometric utilizing the remote control device 101. However, the user may want to make a change that may cause the electronic device to no longer function correctly in some way (such as deleting one or more originally installed programs, incorrectly modifying a communication component's settings such that the communication component can no longer communicate with one or more other devices, and so on). As such, the user may configure a second profile associated with a second biometric that is a copy of the first profile. The user may then make the change to the second profile. If the change causes the electronic device to no longer function, the user may provide the first biometric to configure the electronic device according to the first profile and restore the electronic device to functional operation.

In various cases, the configuration of the electronic device 102 may be partial instead of total. For example, the electronic device may be configured for a user's 103 personal profile such that access to a work file has not been enabled. A biometric associated with the user's work may be remotely received and, in response, the electronic device may be configured to enable access to the work file based on the work profile associated biometric without reconfiguring any other aspect of the electronic device currently configured for the user's personal profile.

Although the system 100 is illustrated and described above in some cases as including a user 103 providing a single biometric, it is understood that this is an example. In various cases, the user may provide a plurality and/or sequence of various biometrics (which may or may not be the same type of biometric) and data associated with the plurality and/or sequence of various biometrics may be utilized to determine which profile of the user's to use. For example, one of the user's profiles may be associated with each of the fingerprints of the user's left hand from pinkie to thumb. As such, the user may provide the user's fingerprints of each finger of the user's left hand from pinkie to thumb via the remote control device 101 in order for the electronic device 102 to configure itself according to that specific profile for the user.

Further, although the system 100 is illustrated and described above as including a user providing a biometric for the user, this is an example. In various cases, the user may provide a biometric for someone other than the user. For example, the user may have a profile of the user's associated with a fingerprint of the user's wife and/or other such biometric of another and the user may arrange for such to be provided via the remote control device 101 in order for the electronic device 102 to configure itself according to that specific profile.

Additionally, though the remote control device 101 is illustrated and described above as transmitting instructions to the electronic device 102, it is understood that this is an example. In various implementations, the remote control device may be capable of transmitting instructions to one or more other electronic devices (such as the additional electronic device(s) 208 of FIG. 2) without departing from the scope of the present disclosure.

FIG. 2 is a block diagram illustrating the functional relationships 200 of components of the system 100 of FIG. 1. The remote control device 101 and the electronic device 102 may be operable to communicate with each other and/or with one or more additional electronic device(s) 208 (such as one or more computing devices configured in a cloud computing configuration) via one or more wired, wireless, local, and/or network communication connections.

As illustrated, the remote control device 101 may include one or more sensors 104, one or more processing units 201, one or more non-transitory storage media 202 (which may take the form of, but is not limited to, a magnetic storage medium; optical storage medium; magneto-optical storage medium; read only memory; random access memory; erasable programmable memory; flash memory; and so on), and/or one or more communication components 203 (such as one or more wired and/or wireless communication components including, but not limited to, one or more Bluetooth communication components, WiFi communication components, infrared communication components, Ethernet communication components, and so on) that may be utilized to communicate with the electronic device 102 and/or the additional electronic device(s) 208.

As also illustrated, the electronic device 102 may include one or more processing units 204, one or more non-transitory storage media 207, one or more communication components 205 that may be utilized to communicate with the remote control device 101 and/or the additional electronic device(s) 208, and/or one or more input/output components 206 (such as one or more displays, speakers, microphones, touch screens, touch pads, keyboards, virtual keyboards, mice, printers, and/or any other input/output device and/or input/output device interface).

Although the remote control device 101 and the electronic device 102 are illustrated and described as including particular components such as processing units 201 and 204, it is understood that these are examples. In various cases, the remote control device and/or the electronic device may include various arrangements of the same, similar, and or different components without departing from the scope of the present disclosure.

For example, in some cases the remote control device 101 may not include a processing unit 201. Instead, the remote control device may only include the sensor 104 and the communication components 203. In such a case, the remote control device may communicate any biometric detected by the sensor 104 to the electronic device 102 via the communication component 203 without performing any processing.

By way of another example, in some cases the electronic device 102 may include one or more sensors (not shown). For instance, in some cases a television may include an ambient light sensor that is utilized in dimming the television display when the ambient lighting is bright and/or brightening the television display when the ambient lighting is dim.

By way of still another example, in some cases the sensor 104 may be the sole user interface component of the remote control device 101.

Further, the additional electronic device(s) 208 may similarly include one or more components (not shown) such as one or more processing units, storage media, communication components, input/output devices, and/or any other such components. For example, the additional electronic device(s) may include one or more communication components for communicating with the remote control device 101 and/or the electronic device 102.

Figure 3:
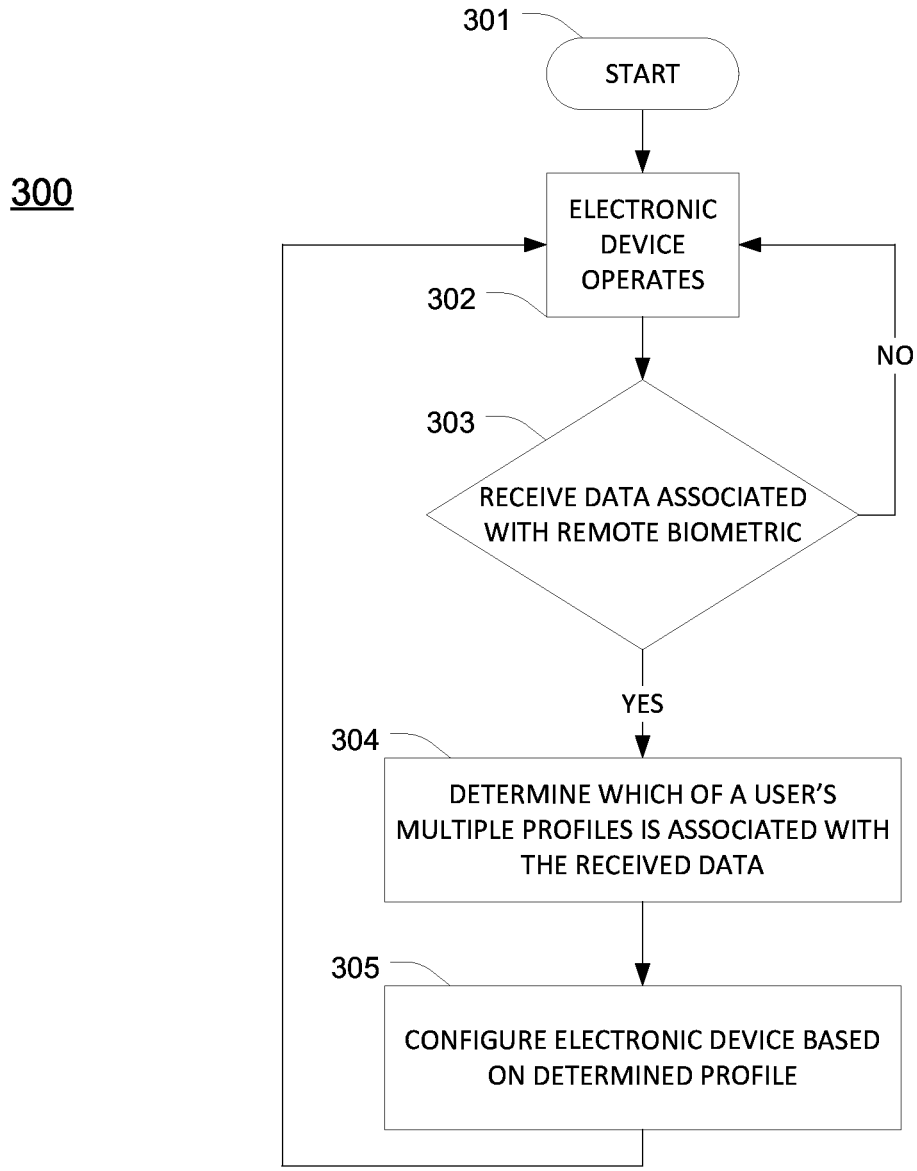
FIG. 3 is a flow chart illustrating a method for configuring electronic devices multiple ways for a single user based on remotely received user biometrics. This method may be performed by the system of FIG. 1.

FIG. 3 is a flow chart illustrating a method 300 for electronic device configuration using remotely received user biometrics. This method may be performed by the system 100 of FIG. 1.

The flow begins at block 301 and proceeds to block 302 where an electronic device operates. The flow then proceeds to block 303 where the electronic device determines whether or not data associated with at least one detected biometric is received from at least one remote control device associated with the electronic device. If so, the flow proceeds to block 304. Otherwise, the flow returns to block 302 where the electronic device continues to operate.

At block 304, after the electronic device determines data associated with at least one detected biometric is received, the electronic device determines which of the user's profiles out of a number of possible profiles for the user (and/or one or more other users) is associated with the received data. The flow then proceeds to block 305 where the electronic device is configured based on the determined profile.

Finally, the flow returns to block 302 where the electronic device continues to operate while configured according to the determined profile.

Although the method 300 is illustrated and described as including particular operations performed in a particular order, it is understood that this is an example. In one or more implementations, the method 300 may include various arrangements of the same, similar, and/or different operations without departing from the scope of the present disclosure.

For example, operation 304 describes the electronic device as determining the which of the user's profiles based on data associated with a biometric received from the remote control device. However, in some implementations the electronic device may receive such data from the remote control device, transmit the data to another computing device (such as a remote data server which may be part of a cloud computing arrangement), receive information in response from the other computing device, and select among the user's profiles based on the received information from the other computing device. For instance, the received information may include an identifier associated with the transmitted data that is used to select among the user's profiles.

Figure 4:
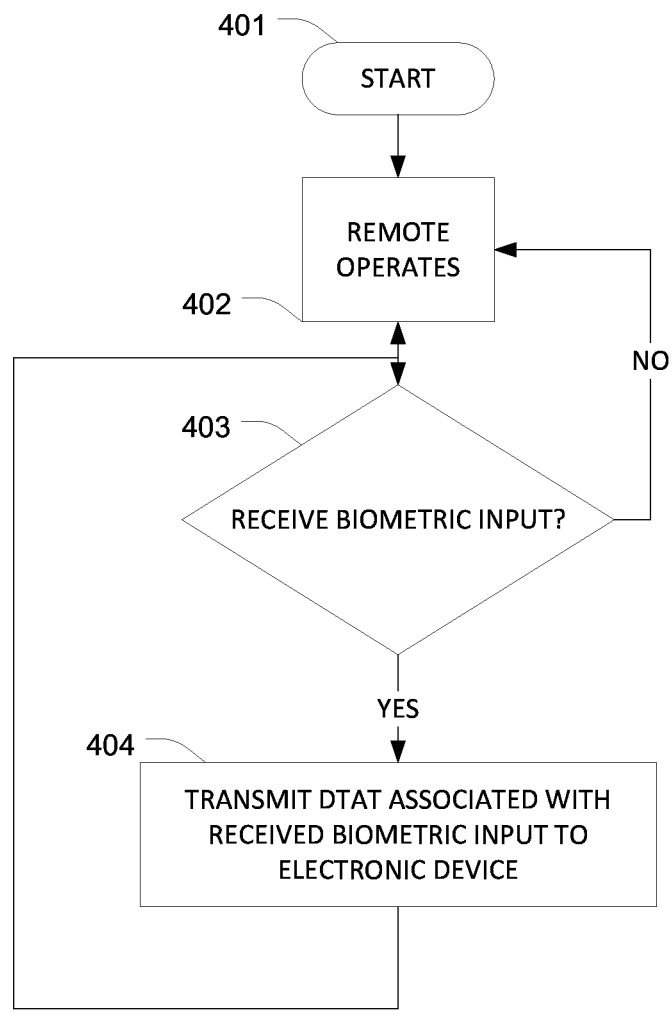
FIG. 4 is a flow chart illustrating a method for remotely obtaining user biometrics that may be utilized with the method of FIG. 3. This method may be performed by the system of FIG. 1.

FIG. 4 is a flow chart illustrating a method 400 for remotely obtaining user biometrics that may be utilized with the method 300 of FIG. 3. This method 400 may be performed by the system of FIG. 1.

The flow begins at block 401 and proceeds to block 402 where a remote control device operates. The flow then proceeds to block 403 where the remote control device determines whether or not one or more biometrics is detected via one or more sensors. If so, the flow proceeds to block 404. Otherwise, the flow returns to block 402 where the remote control device continues to operate.

At block 404, after the remote control device determines that a biometric is detected, the remote control device transmits data associated with the received biometric to the electronic device. The flow then returns to block 402 where the remote control device continues to operate.

Although the method 400 is illustrated and described as including particular operations performed in a particular order, it is understood that this is an example. In one or more implementations, the method 400 may include various arrangements of the same, similar, and/or different operations without departing from the scope of the present disclosure.

For example, the operation 404 describes the remote control device transmitting data to the electronic device regarding any biometric that is received. However, in various cases the remote control device may first confirm that the biometric is recognized before transmitting the data. In such a case, if the remote control device has not been configured to recognize a particular user's biometric, the remote control device may not transmit any data regarding that user's biometric.

As discussed above and illustrated in the accompanying figures, the present disclosure discloses systems and methods for configuring electronic devices multiple ways for a single user based on remotely received user biometrics. An electronic device may receive data associated with at least one biometric detected by a sensor of a remote control device. A profile for a user associated with the data may be determined out of a number of profiles for the user based on the data. The electronic device may then be configured in one or more ways according to the determined user profile.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for configuring electronic devices multiple ways for a single user based on remotely received user biometrics, comprising:
  at least one remote control device, comprising:
    at least one sensor that detects at least one biometric; and
  at least one electronic device that is configured to receive at least one instruction from the at least one remote control device;
  wherein the at least one electronic device receives data associated with the at least one biometric, determines which profile of a user is associated with the data out of a plurality of profiles for the user, and configures the at least one electronic device according to the profile; and
  wherein the at least one electronic device:
  receives the data associated with the at least one biometric at a first time;
  receives information associated with an additional biometric at a second time;
  receives the data associated with the at least one biometric at a third time; and
  determines suggested content to recommend based on content that was accessed at at least one of the first time or the third time, but not the second time.

2. The system of claim 1, wherein at least a first of the plurality of profiles for the user is associated with a first at least one biometric and at least a second of the plurality of profiles for the user is associated with a second at least one biometric.

3. The system of claim 2, wherein the first at least one biometric comprises at least a first fingerprint of the user and the second at least one biometric comprises a second fingerprint of the user.

4. The system of claim 1, wherein the at least one electronic device receives additional data associated with at least one additional biometric, determines an additional profile of the user that is associated with the additional data out of the plurality of possible profiles for the user, and reconfigures the at least one electronic device according to the additional profile.

5. The system of claim 4, wherein the profile and the additional profile include at least one different configuration setting.

6. The system of claim 4, wherein the profile corresponds to a work mode of the at least one electronic device and the additional profile corresponds to a personal mode of the at least one electronic device.

7. The system of claim 1, wherein the at least one electronic device reconfigures the at least one electronic device according to an additional profile upon the occurrence of at least one reconfiguration event.

8. The system of claim 1, wherein the data associated with the at least one biometric comprises at least one of the at least one biometric, at least one hash value derived from the at least one biometric, or at least one identifier associated with the at least one biometric.

9. The system of claim 1, wherein configuring the at least one electronic device comprises configuring at least one recommendation provided by the at least one electronic device.

10. The system of claim 1, wherein the at least one electronic device receives additional data associated with at least one additional biometric, determines an additional profile not associated with the user that is associated with the data, and reconfigures the at least one electronic device according to the additional profile.

11. The system of claim 1, wherein the plurality of possible profiles for the user includes at least one of at least one generic profile that is not associated with a biometric or at least one default profile.

12. The system of claim 1, wherein the at least one sensor is a sole user interface component of the at least one remote control device.

13. The system of claim 1, wherein the at least one electronic device receives at least one request for at least one operation that is not permitted according to the profile, prompts for entry of at least one additional biometric associated with an additional profile for the user according to which the at least one operation is permitted, and permits the at least one operation if additional data associated with the at least one additional biometric is received.

14. The system of claim 1, wherein configuring the at least one electronic device comprises configuring at least one of at least one favorite, at least one contact, at least one calendar entry, at least one datebook entry, or at least one email database entry.

15. The system of claim 1, wherein the at least one biometric comprises at least one fingerprint.

16. The system of claim 15, wherein the at least one fingerprint comprises a sequence of fingerprints.

17. The system of claim 1, wherein the at least one sensor comprises at least one touch sensor.

18. The system of claim 1, wherein configuring the at least one electronic device comprises at least one of providing access to at least one file, providing access to at least one application, preventing access to the at least one file, preventing access to the at least one application, altering the presentation of at least one user interface, enabling at least one hardware component, enabling at least one software component, disabling the at least one hardware component, disabling the at least one software component, altering a way with which the at least one user interface is interacted with, modifying at least one presentation setting, altering functionality of the at least one hardware component, altering functionality of the at least one software component, organizing storage of the at least one file, or organizing storage of the at least one application.

19. A method for configuring electronic devices based on remotely received user biometrics, the method comprising:
receiving at a first time, utilizing at least one electronic device, data associated with at least one biometric detected by at least one sensor of at least one remote control device that is configured to transmit at least one instruction to the at least one electronic device;
determining, utilizing the at least one electronic device, which profile of a user is associated with the data out of a plurality of profiles for the user;
configuring the at least one electronic device according to the determined profile;
receiving information associated with an additional biometric at a second time;
receiving the data associated with the at least one biometric at a third time; and
determining suggested content to recommend based on content that was accessed at at least one of the first time or the third time, but not the second time.

20. An electronic device, comprising:
at least one communication component that is configured to receive at least one instruction from at least one remote control device; and
at least one processing unit that:
receives data associated with at least one biometric detected at a first time by at least one sensor of the at least one remote control device;
determines which profile of a user is associated with the data out of a plurality of profiles for the user;
configures the electronic device according to the profile;
receives information associated with an additional biometric at a second time;
receives the data associated with the at least one biometric at a third time; and
determines suggested content to recommend based on content that was accessed at at least one of the first time or the third time, but not the second time.

* * * * *